US012580639B2

(12) United States Patent     (10) Patent No.:   US 12,580,639 B2
Li     (45) Date of Patent:    Mar. 17, 2026

(54) COMMUNICATION PROCESSING METHOD, COMMUNICATION PROCESSING DEVICE, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 490 days.

(21) Appl. No.: 18/002,380

(22) PCT Filed: Aug. 5, 2020

(86) PCT No.: PCT/CN2020/107203
§ 371 (c)(1),
(2) Date: Dec. 19, 2022

(87) PCT Pub. No.: WO2022/027360
PCT Pub. Date: Feb. 10, 2022

(65) Prior Publication Data
US 2023/0231620 A1     Jul. 20, 2023

(51) Int. Cl.
*H04W 24/08*     (2009.01)
*H04B 7/185*     (2006.01)

(52) U.S. Cl.
CPC ..... *H04B 7/18519* (2013.01); *H04B 7/18541* (2013.01); *H04W 24/08* (2013.01)

(58) Field of Classification Search
CPC .. H04B 7/185; H04B 7/1851; H04B 7/18513; H04B 7/18519; H04B 7/18541; H04W 24/08; H04W 24/10
See application file for complete search history.

(56) References Cited

U.S. PATENT DOCUMENTS

| | | | | |
|---|---|---|---|---|
| 9,014,620 | B2* | 4/2015 | Dankberg | .......... H04B 7/18519 |
| | | | | 455/12.1 |
| 9,762,314 | B2* | 9/2017 | Ulupinar | ........... H04W 36/0085 |
| 10,382,120 | B2* | 8/2019 | Montsma | ........... H04B 7/18508 |
| 10,855,365 | B2* | 12/2020 | Lejnell | ............... H04B 7/18515 |
| 2019/0222299 | A1* | 7/2019 | Treesh | .................. H04W 36/24 |
| 2019/0238287 | A1* | 8/2019 | Zhou | ................... H04W 52/143 |
| 2019/0273637 | A1* | 9/2019 | Zhang | ................... H04L 5/0051 |

(Continued)

FOREIGN PATENT DOCUMENTS

| | | |
|---|---|---|
| CN | 111095824 A | 5/2020 |
| CN | 111371486 A | 7/2020 |
| KR | 20200086623 A | 7/2020 |

OTHER PUBLICATIONS

International Search Report and Written Opinion of International Application No. PCT/CN2020/107203, dated Apr. 25, 2021, 16 pages.

(Continued)

*Primary Examiner* — Alpus Hsu
(74) *Attorney, Agent, or Firm* — Finnegan, Henderson, Farabow, Garrett & Dunner, L.L.P.

(57) ABSTRACT

A method for communication processing is performed by a terminal, and includes: obtaining measurement information of an adjacent satellite beam footprint of a satellite beam footprint to which the terminal currently belongs; and measuring a reference signal of the adjacent satellite beam footprint based on the measurement information.

18 Claims, 3 Drawing Sheets obtaining measurement information of an adjacent satellite beam footprint of a satellite beam footprint to which a terminal currently belongs    S11 measuring a reference signal of the adjacent satellite beam footprint based on the measurement information    S12

(56)                    References Cited

U.S. PATENT DOCUMENTS

| 2019/0281587 | A1  | 9/2019  | Zhang et al. |
| 2020/0052782 | A1* | 2/2020  | Wang ................. H04B 7/18541 |
| 2020/0177265 | A1* | 6/2020  | Guan ..................... H04B 7/088 |
| 2021/0242935 | A1* | 8/2021  | Sakhnini ............ H04B 7/18543 |
| 2021/0258898 | A1* | 8/2021  | Ma ......................... H04L 5/0053 |
| 2021/0377825 | A1* | 12/2021 | Deenoo ............... H04B 7/1851 |
| 2022/0030532 | A1* | 1/2022  | Hajir .................. H04B 7/18513 |
| 2022/0038168 | A1* | 2/2022  | Ma .......................... H04L 1/203 |

OTHER PUBLICATIONS

Ericsson (Email discussion rapporteur), Report of email discussion [103bis#34] [NR-NTN], 3GPP TSG-RAN WG2 Meeting #103bis, Tdoc R2-1817754, Spokane, US, Nov. 12-16, 2018, 14 pages.
Examination report for Indian Application No. 202347002500, issued on Jul. 13, 2023, 6 pages.
Extended European Search Report Issued in Application No. 20948397.3 dated Mar. 28, 2024, 8 pages.
Notice of Second Office Action issued by the China National Intellectual Property Administration on Apr. 19, 2024, in corresponding Application No. CN 202080001872.3 (12 pages).

* cited by examiner

100

COMMUNICATION PROCESSING METHOD, COMMUNICATION PROCESSING DEVICE, AND STORAGE MEDIUM

CROSS-REFERENCE TO RELATED APPLICATION

This application is the U.S. national phase application of International Application No. PCT/CN2020/107203, filed on Aug. 5, 2020, the entire disclosure of which is incorporated herein by reference.

TECHNICAL FIELD

The disclosure relates to a field of communication technology, in particular to a method and an apparatus for communication processing, and a storage medium.

BACKGROUND

With the development of communication technology, satellite communication was introduced.

In the satellite communication, in order to improve a signal strength, different beams are used by satellites to cover different areas, and a coverage area of each satellite beam can be called a beam footprint. To avoid co-channel interference, different beams and different frequency domain resources are used by different beam footprints. Similarly, in order to avoid interference between different satellites, if different satellites cover the same location on the ground, different frequency domain resources also need to be used. This is true both for signaling beams (such as synchronization signal blocks, SSBs) and data beams. Moreover, signaling frequency domain resources and data frequency domain resources of the same location covered by the same satellite may be the same or different. The different frequency domain resources may be different bandwidth parts (BWPs) or different component carriers (CCs).

SUMMARY

According to a first aspect of the disclosure, a method for communication processing is performed by a terminal. The method includes:
  obtaining measurement information of an adjacent satellite beam footprint of a satellite beam footprint to which the terminal currently belongs; and measuring a reference signal of the adjacent satellite beam footprint based on the measurement information.
  According to a second aspect of the disclosure, a terminal is provided, including:
  a processor; and a memory for storing instructions executable by the processor;
  The processor is configured to obtain measurement information of an adjacent satellite beam footprint of a satellite beam footprint to which the terminal currently belongs; and measure a reference signal of the adjacent satellite beam footprint based on the measurement information.
  According to a third aspect of the disclosure, a non-transitory computer-readable storage medium is provided. When instructions in the storage medium are executed by a processor of a mobile terminal, the mobile terminal is caused to execute a method for communication processing. The method includes: obtaining measurement information of an adjacent satellite beam footprint of a satellite beam footprint to which the mobile terminal currently belongs; and measuring a reference signal of the adjacent satellite beam footprint based on the measurement information.

It should be understood that the above general description and the following detailed description are exemplary and explanatory only, which are not restrictive of the disclosure.

BRIEF DESCRIPTION OF THE DRAWINGS

The accompanying drawings, which are incorporated in and constitute a part of this specification, illustrate embodiments consistent with the invention and together with the description serve to explain the principles of the disclosure.

DETAILED DESCRIPTION

Reference will now be made in detail to the embodiments, examples of which are illustrated in the accompanying drawings. When the following description refers to the accompanying drawings, the same numerals in different drawings refer to the same or similar elements unless otherwise indicated. The implementations described in the following examples do not represent all implementations consistent with the present invention. Rather, they are merely examples of apparatuses and methods consistent with aspects of the invention as recited in the appended claims.

Figure 1:
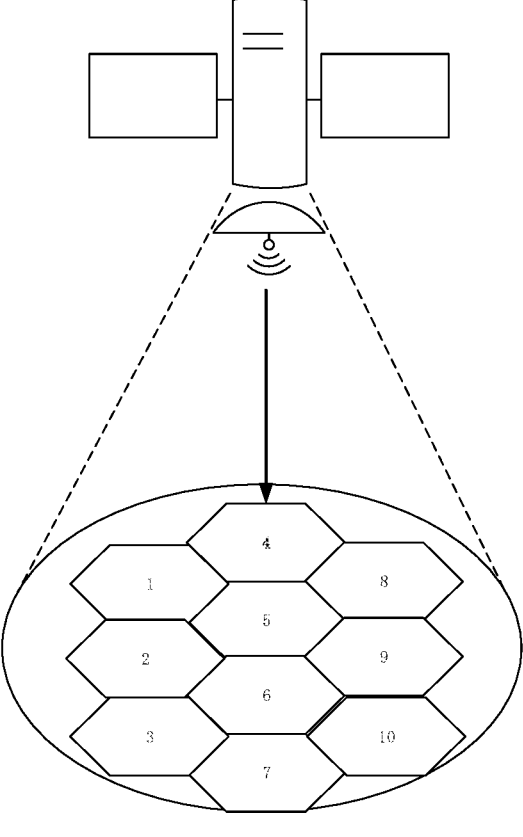
FIG. 1 is an architecture diagram illustrating a satellite communication system according to an embodiment.

The method for communication processing in the embodiments of the disclosure is applied to a satellite communication system. FIG. 1 is an architecture diagram of a satellite communication system according to an embodiment Referring to FIG. 1, different beams are used by satellites to cover different areas, and each satellite beam coverage area can be called a beam footprint, for example, the satellite beam coverage areas 1, 2, 3, 4 . . . 10 in FIG. 1 may be called beam footprints. The beam footprint may be referred to as a satellite beam coverage area, and may also be referred to as a satellite cell. The embodiments of the disclosure will be described below by using the satellite beam coverage area as an example. The coverage areas between the satellite beam coverage areas may not overlap, may also partially overlap, or may also completely overlap. The terminal may be deployed within a satellite network coverage. The terminals located within the satellite network coverage area communicate via a service link between the satellite beam coverage areas and the satellites. The satellites communicate with ground infrastructure via a feeder link, such as a base station, a gateway and other network devices, which thus realizes interaction communication with ground communication networks, such as core networks and data networks.

On the one hand, under the coverage of the same satellite, identities (IDs) of different satellite beam footprints are the same, in which the satellite beam footprint ID may be a physical cell ID (PCI). That is, all the satellite beam footprints under the same satellite coverage belong to a cell. The satellite beam footprint ID may also be a satellite ID. On the other hand, under the coverage of the same satellite, the PCIs of different satellite beam footprints are different, that is, the satellite beam footprints under the same satellite coverage belong to different cells, but the satellite IDs are identical.

For the terminals in an idle state or an inactive state, due to the movement of satellites or terminals, there may be reselection or handover of beam footprints, so that the terminals always stay in the current best beam footprint and may obtain the service through the best beam/frequency domain resources when the terminal enters a connected state. For example, in the case of satellite movement or terminal movement, reselection or handover between different beam footprints is needed, but there is no method for reselection or handover between beam footprints in the related art. Embodiments of the disclosure are described below by taking the reselection as an example.

For the terminals in the idle state or the inactive state, the following two situations are mainly considered in performing reselection of signaling beam/frequency domain resources.

In the first situation, PCIs used by different satellite beam footprints covered by the satellites are different, and the frequency domain resources are the same or different. In this situation, similar to the case in the existing New Radio (NR), it is sufficient to configure adjacent cell measurements of the same frequency and of different frequencies.

In the second situation, the PCIs used by different satellite beam footprints covered by the satellites are identical, and the frequency domain resources are the same or different. In this situation, unlike the NR system that does not have such a configuration, a new reselection method (or may also be called a handover method) for beam/frequency domain resources is needed The embodiment of the disclosure provides a method for communication processing, in which measurement information of an adjacent satellite beam footprint of a satellite beam footprint to which a terminal currently belongs is obtained, and a reference signal (RS) of the adjacent satellite beam footprint is measured based on the measurement information. Based on a RS measurement result in the adjacent satellite beam footprint, reselection of different satellite beam footprints may be achieved, and reselection of new beam/frequency domain resources may be further performed.

It may be understood that, the terminals involved in the embodiments of the disclosure may include, but are not limited to: cellular and/or satellite wireless phones with or without a multi-line display: a personal communication system (PCS) terminal that may combine wireless phones with data processing, fax and/or data communication capabilities: a personal digital assistant (PDA) that includes a radio frequency (RF) transceiver and a pager, Internet/Intranet access, a web browser, an organizer, a calendar, and/or a global positioning system (GPS) receiver; and/or other devices that include the RF transceiver. The terminals involved in the embodiments of the disclosure are sometimes called wireless phones or satellite terminals, and may also be called a terminal device, a user equipment (UE), a mobile station (MS), a mobile terminal (MT), etc., which is a device that provides voice and/or data connectivity to users. For example, the terminal may be a handheld device with a wireless connection function, a vehicle-mounted device, an Internet of Things (IoT) device, an industry IoT devices (IIoT), etc. At present, some examples of terminals are: mobile phones, pocket personal computers (PPCs), palmtop computer, PDAs, notebook computers, tablet computers, wearable devices, or vehicle-mounted devices, etc. In addition, when it is a vehicle-to-everything (V2X) communication system, the terminal device may also be a vehicle-mounted device. It should be understood that the embodiment of the disclosure does not limit the specific technology and specific device form adopted by the terminal.

Further, the network devices involved in the disclosure include satellite and radio access network devices, where the radio access network device may be: a base station, an evolved node B, a home base station, an access point (AP) in a wireless fidelity (WIFI) system, a wireless relay node, a wireless backhaul node, a transmission point (TP) or a transmission and reception point (TRP), etc. The radio access network device may also be a gNB in the NR system, or may also be a component or a part of devices constituting a base station. It should be understood that the embodiments of the disclosure do not limit the specific technology and specific device form adopted by the network device.

When it is a direct-to-connect communication (D2D) or vehicle-to-everything (V2X) communication system, the wireless access network device may also be a terminal, such as a vehicle-mounted device.

Figure 2:
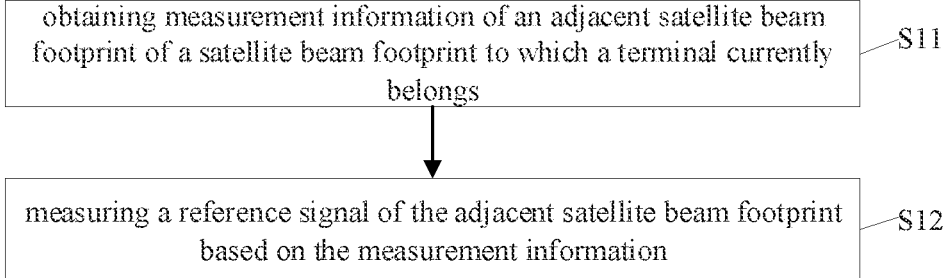
FIG. 2 is a flowchart illustrating a method for communication processing according to an embodiment.

FIG. 2 is a flowchart illustrating a method for communication processing according to an embodiment. As shown in FIG. 2, the method for communication processing is used in a terminal and includes the following steps.

At S11, measurement information of an adjacent satellite beam footprint of a satellite beam footprint to which a terminal currently belongs is obtained.

In the embodiment of the disclosure, the terminal may obtain the measurement information of the adjacent satellite beam footprint by receiving system information.

After the terminal obtains the measurement information of the adjacent satellite beam footprint, the terminal may measure the RS of the adjacent satellite beam footprint according to the measurement information.

At S12, based on the obtained measurement information, an RS of the adjacent satellite beam footprint is measured.

The method for communication processing according to the embodiment of the disclosure measures the RS of the adjacent satellite beam footprint based on the measurement information of the adjacent satellite beam footprint for the terminal under a satellite coverage, and when the PCI remains unchanged, the measurement and reselection of different frequency domain resources and different beams may be achieved, so that the terminal may stay in the best frequency domain resources and the best beam footprint in real time, reducing the delay in transitioning to the connected state.

In the embodiments of the disclosure, the method for communication processing involved above will be described below in combination with practical applications.

In an example of the embodiments of the disclosure, as shown in FIG. 1, it is assumed that the satellite beam footprint to which the terminal currently belongs is the satellite beam footprint 4. The satellite beam footprint adjacent to the above-described satellite beam footprint 4 may be the satellite beam footprint 1, the satellite beam footprint 5, and/or the satellite beam footprint 8 and the like.

The adjacent satellite beam footprints may be determined based on one or more of a PCI, a base station ID, an RS ID, a bandwidth part (BWP) and/or a component carrier (CC).

In an implementation, the currently-belonging satellite beam footprint has the same PCI as the adjacent satellite beam footprint.

In an example, the measurement information includes information about an adjacent satellite beam footprint in the same cell (intra-cell) as the currently-belonging satellite beam footprint. The Intra-cell may be understood as that the PCI of the adjacent satellite beam footprint is the same as that of the currently-belonging satellite beam footprint. For the adjacent satellite beam footprint that has the same PCI as the currently-belonging satellite beam footprint, there is no need to indicate a PCI, or the indicated PCI is the same as the current PCI.

In an implementation, the currently-belonging satellite beam footprint and the adjacent satellite beam footprint have different PCIs.

In an example, the measurement information includes information about an adjacent satellite beam footprint in different cells (inter-cells) from the currently-belonging satellite beam footprint. The inter-cells may be understood as that the PCI of the adjacent satellite beam footprint is different from that of the currently-belonging satellite beam footprint. For the adjacent satellite beam footprint that has a different PCI from the currently-belonging satellite beam footprint, the PCI needs to be indicated. In an example, the measurement information includes a physical cell identity of a cell to which the adjacent satellite beam footprint belongs. And/or, the measurement information includes a satellite ID of a satellite to which the adjacent satellite beam footprint belongs.

In the embodiment of the disclosure, for the adjacent satellite beam footprint and the currently-belonging satellite beam footprint have the same or different PCIs, and the measurement information further includes frequency domain resource information of the adjacent satellite beam footprint.

In an example, the frequency domain resource information of the adjacent satellite beam footprint includes one or more of a frequency domain resource ID, a frequency point position of frequency domain resources, a bandwidth of frequency domain resources, a sub-carrier spacing (SCS) and a cyclic prefix.

The frequency domain resources in the embodiment of the disclosure include one or more of CC and BWP. The frequency domain resource ID may be a CC ID and/or a BWP ID. The frequency point position of the frequency domain resources may be a frequency point position of the CC, and/or a frequency point position of the BWP. The bandwidth of the frequency domain resources may be a bandwidth of the CC, and/or a bandwidth of the BWP.

In an implementation, the currently-belonging satellite beam footprint and the adjacent satellite beam footprint are in a coverage area of the same satellite.

In an example, the measurement information includes information that the currently-belonging satellite beam footprint and the adjacent satellite beam footprint are in a coverage area of the same satellite (intra-satellite). The intra-satellite means that the terminal is under the coverage of the same satellite, and at least the satellite ID is the same.

The currently-belonging satellite beam footprint and the adjacent satellite beam footprint are in a coverage area of the same satellite, and the measurement information may include a PCI or a satellite ID, and may also include frequency domain resource information and RS resource configuration information. For a case where the currently-belonging satellite beam footprint and the adjacent satellite beam footprint use the same frequency domain resources, the frequency domain resources may not be indicated, but the PCI may be indicated.

In an implementation, the currently-belonging satellite beam footprint and the adjacent satellite beam footprint are in coverage areas of different satellite.

In an example, the measurement information includes information that the currently-belonging satellite beam footprint and the adjacent satellite beam footprint are in coverage areas of different satellites (inter-satellites). The inter-satellites mean that the terminal is under the coverages of different satellites, and the satellite IDs of different satellites are different.

The frequency domain resources under different satellites are different. The frequency domain resources used by the currently-belonging satellite beam footprint and the adjacent satellite beam footprint are different. For example, they may be different BWPs (Inter-BWPs). The inter-BWPs refer to different frequency domain resources.

In an example, the currently-belonging satellite beam footprint and the adjacent satellite beam footprint are in coverage areas of different satellite, and the measurement information includes BWP information, a PCI or a satellite ID.

The BWP information in the embodiment of the disclosure may include one or more of a BWP ID, a BWP location and a BWP bandwidth, a SCS, a cyclic prefix, and the like.

In an implementation, a frequency domain resource used by the currently-belonging satellite beam footprint is the same as or different from a frequency domain resource used by the adjacent satellite beam footprint.

In an example, the measurement information includes information about the same bandwidth part (intra-BWP) used by the currently-belonging satellite beam footprint and the adjacent satellite beam footprint. The intra-BWP means that the frequency domain resources are identical. For a case where the currently-belonging satellite beam footprint and the adjacent satellite beam footprint use the same frequency domain resources, the frequency domain resources may not be indicated, but the PCI or the satellite ID is indicated.

In an example, the measurement information includes information about different bandwidth parts (Inter-BWPs) used by the currently-belonging satellite beam footprint and the adjacent satellite beam footprint. The inter-BWPs refer to different frequency domain resources. For a case where the currently-belonging satellite beam footprint and the adjacent satellite beam footprint use different frequency domain resources, the measurement information includes BWP information, a PCI or a satellite ID, and RS resource configuration information.

The BWP information in the embodiment of the disclosure may include one or more of a BWP ID, a BWP location and a BWP bandwidth, a SCS, a cyclic prefix, and the like.

In an example, the measurement information includes information about the same CC (intra-CC) used by the currently-belonging satellite beam footprint and the adjacent satellite beam footprint.

On the one hand, the intra-CC refers to the same frequency domain resource. For a case where the currently-belonging satellite beam footprint and the adjacent satellite beam footprint use the same frequency domain resources, the frequency domain resources do not need to be indicated, but the PCI or satellite ID is indicated. That is, the measurement information needs to include the PCI or satellite ID. On the other hand, the intra-CC can also refer to the same CC, but a different BWP under one CC is used. That is, it may be understood that the CC used by the currently-belonging satellite beam footprint is the same as that used by the adjacent satellite beam footprint, while the BWP used by the currently-belonging satellite beam footprint is different from that used by the adjacent satellite beam footprint. For a case where the currently-belonging satellite beam footprint and the adjacent satellite beam footprint use the same CC and different BWPs, the measurement information includes BWP information, and includes a PCI or a satellite ID. The BWP information includes one or more of a BWP ID, a location and bandwidth of a BWP, and a SCS.

In an example, the measurement information includes information about different CCs (Inter-CCs) used by the currently-belonging satellite beam footprint and the adjacent satellite beam footprint. The inter-CCs refer to different frequency domain resources.

On the one hand, the different CC's may be understood as that the CC used by currently-belonging satellite beam footprint is different from that used by the adjacent satellite beam footprint. For a case where the CC used by currently-belonging satellite beam footprint is different from that used by the adjacent satellite beam footprint, the measurement information may include CC information, a PCI or a satellite ID. The CC information may include one or more of a CC ID, a location and bandwidth of a CC, and a SCS The measurement information of the adjacent satellite beam footprint involved in the embodiments of the disclosure includes information needed by other terminals for communication, in addition to the content information involved in the above embodiments. In an example, the measurement information includes resource configuration information of the RS in the adjacent satellite beam footprint. The resource configuration information includes at least one of a RS resource ID, RS resource time domain information, RS resource frequency domain information, RS resource code domain information and RS resource antenna port information. The RS resource ID includes at least one of a synchronization signal block (SSB) ID, a channel state information-reference signal (CSI-RS) ID, and a positioning reference signal (PRS) ID.

In the embodiment of the disclosure, the terminal obtains the measurement information of the adjacent satellite beam footprint, and may measure the RS of the adjacent satellite beam footprint based on the measurement information.

In an implementation of the embodiments of the disclosure, when the terminal measures that a reference signal received power (RSRP) in the currently-belonging satellite beam footprint is lower than a specified received power threshold or a reference signal received quality (RSRQ) is lower than a specified received quality threshold, the RS of the adjacent satellite beam footprint is measured based on the measurement information.

Figure 3:
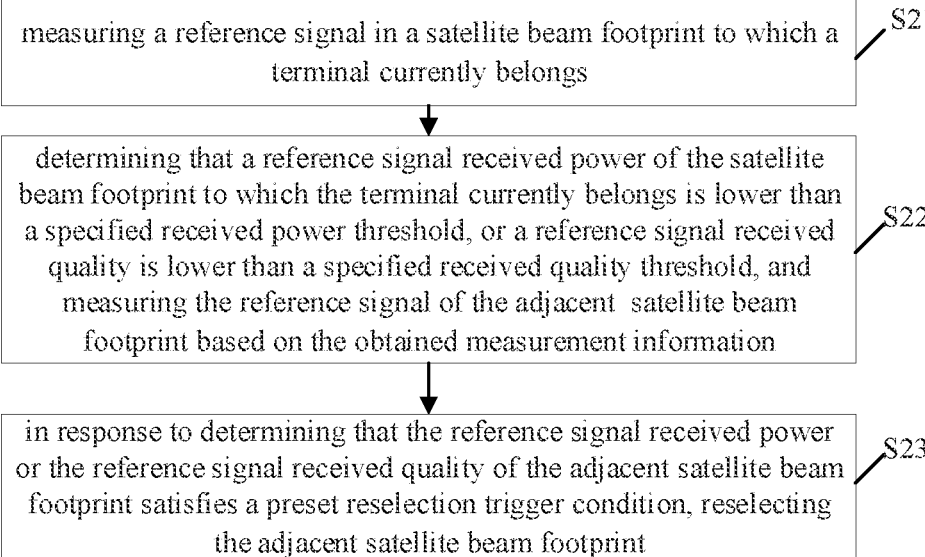
FIG. 3 is a flowchart illustrating a method for communication processing according to an embodiment.

FIG. 3 illustrates a method for communication processing according to an embodiment of the disclosure. Referring to FIG. 3, the method includes the following steps performed by a terminal.

At S21, the RS within the currently-belonging satellite beam footprint is measured.

In an example, in the embodiment of the disclosure, the RS within the currently-belonging satellite beam footprint is measured, for example, the RSRP or the RSRQ is measured.

In the embodiment of the disclosure, when it is determined that the RSRP in the currently-belonging satellite beam footprint is lower than the specified received power threshold, or the RSRQ is lower than the specified received quality threshold, the RS of the adjacent satellite beam footprint is measured based on the obtained measurement information.

At S22, it is determined that the RSRP in the currently-belonging satellite beam footprint is lower than the specified receiving power threshold, or the RSRQ is lower than the specified receiving quality threshold, and the RS of the adjacent satellite beam footprint is measured based on the obtained measurement information.

In the embodiment of the disclosure, when the terminal measures the RS of the adjacent satellite beam footprint based on the obtained measurement information, in a manner, the terminal receives the RS of the adjacent satellite beam footprint by receiving a beam sweeping signal (Rx beam sweeping).

In the embodiment of the disclosure, during the measurement process of the terminal, the terminal may use the Rx beam sweeping to receive the RS of the adjacent satellite beam footprint, and measure the RS of the adjacent satellite beam footprint.

In an example, the terminal may measure the RSRP or RSRQ of the RS of the adjacent satellite beam footprint, and determine the most suitable receive beam (Rx beam).

In the embodiment of the disclosure, when the terminal determines that the RSRP or RSRQ of the adjacent satellite beam footprint satisfies a preset reselection trigger condition, the terminal reselects the adjacent satellite beam footprint.

Further, the method for communication processing according to the embodiment of the disclosure may further include the following step S23 on the basis of the above steps at S21-S22.

At S23, when it is determined that the RSRP or RSRQ of the adjacent satellite beam footprint satisfies a preset reselection trigger condition, reselection to the adjacent satellite beam footprint is performed.

In the embodiment of the disclosure, when the RSRP/ RSRQ of the RS of the adjacent satellite beam footprint satisfies the trigger condition, the terminal reselects or hands over to frequency domain resources and beam resources where a new satellite beam footprint is located, thus realizing reselection of new frequency domain resources and beam resources.

Through the method for communication processing according to the embodiments of the disclosure, in the case that the terminal keeps the PCI unchanged under the satellite coverage, the measurement and reselection of different frequency domain resources and different beams can be realized, so that the terminal may stay in real time within the optimal frequency domain resources and optimal beam footprint, reducing the delay in transitioning to the connected state.

It should be noted that those skilled in the art may understand that the various implementations/embodiments mentioned above in the embodiments of the disclosure may be used in conjunction with the foregoing embodiments, or may be used independently. Whether it is used alone or in combination with the foregoing embodiments, the implementation principles are similar. In the implementation of the disclosure, some embodiments are described in a manner of being used together. Those skilled in the art may understand that such illustration does not limit the embodiments of the disclosure.

Based on the same concept, an embodiment of the disclosure further provides an apparatus for communication processing.

It may be understood that, in order to realize the above-mentioned functions, the apparatus for communication processing according to the embodiments of the disclosure includes corresponding hardware structures and/or software modules for performing various functions. Combining the units and algorithm steps of each example disclosed in the embodiments of the disclosure, the embodiments of the disclosure may be implemented in the form of hardware or a combination of hardware and computer software. Whether a certain function is executed in hardware or in computer software driving hardware depends on a specific application and design constraints of the technical solution. Those skilled in the art may use different methods to implement the described functions for each specific application, but such implementation should not be regarded as going beyond the scope of the technical solutions of the embodiments of the disclosure.

Figure 4:
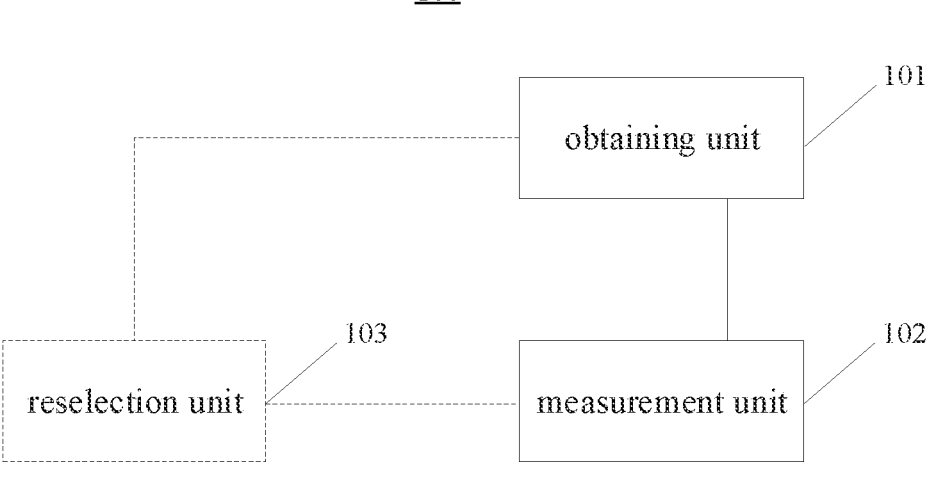
FIG. 4 is a block diagram illustrating an apparatus for communication processing according to an embodiment.

FIG. 4 is a block diagram of an apparatus for communication processing according to an embodiment. Referring to FIG. 4, the apparatus 100 for communication processing includes an obtaining unit 101 and a measurement unit 102.

The obtaining unit 101 is configured to obtain measurement information of an adjacent satellite beam footprint of a satellite beam footprint to which a terminal currently belongs. The measurement unit 102 is configured to measure a reference signal (RS) of the adjacent satellite beam footprint based on the measurement information.

The adjacent satellite beam footprint may be determined based on one or more of a physical cell identity (PCI), a base station ID, a RS ID, a BWP and/or a CC.

In an implementation, the currently-belonging satellite beam footprint and the adjacent satellite beam footprint have a same PCI.

In an implementation, the currently-belonging satellite beam footprint and the adjacent satellite beam footprint have different PCIs.

In an implementation, the measurement information further includes frequency domain resource information of the adjacent satellite beam footprint.

In an implementation, the currently-belonging satellite beam footprint and the adjacent satellite beam footprint are in a coverage area of a same satellite.

In an implementation, a frequency domain resource used by the currently-belonging satellite beam footprint is the same as a frequency domain resource used by the adjacent satellite beam footprint.

In an implementation, the measurement information includes a physical cell identity of a cell to which the adjacent satellite beam footprint belongs, or a satellite identity.

In an implementation, the currently-belonging satellite beam footprint and the adjacent satellite beam footprint are in coverage areas of different satellites.

In an implementation, a frequency domain resource used by the satellite beam footprint to which the terminal currently belongs is different from a frequency domain resource used by the adjacent satellite beam footprint.

In an implementation, the measurement information further includes BWP information, a PCI or a satellite ID.

In an implementation, the frequency domain resource includes one or more of a CC and a BWP.

In an implementation, a CC used by the currently-belonging satellite beam footprint is the same as a CC used by the adjacent satellite beam footprint, and a BWP used by the currently-belonging satellite beam footprint is different from a BWP used by the adjacent satellite beam footprint. The measurement information includes BWP information, and includes a PCI or a satellite ID.

In an implementation, the CC used by the currently-belonging satellite beam footprint is different from the CC used by the adjacent satellite beam footprint. The measurement information includes CC information, a PCI or a satellite ID.

In an implementation, the measurement information includes an ID of the adjacent satellite beam footprint and/or a satellite ID.

In an implementation, the measurement information includes resource configuration information of the RS of the adjacent satellite beam footprint, and the resource configuration information comprises at least one of RS resource identity, RS resource time domain information, RS resource frequency domain information, RS resource code domain information, and RS resource antenna port information.

In an implementation, the measurement unit 102 is further configured to: before measuring the RS of the adjacent satellite beam footprint based on the measurement information, determine that a RSRP in the currently-belonging satellite beam footprint is lower than a specified received power threshold, or a RSRQ is lower than a specified reception quality threshold.

In an implementation, the apparatus 100 for communication processing further includes a reselection unit 103. The reselection unit 103 is configured to:

in response to determining that the RSRP or the RSRQ of the adjacent satellite beam footprint satisfies a preset reselection trigger condition, reselect the adjacent satellite beam footprint.

Regarding the apparatus in the foregoing embodiments, the specific manner in which each module executes operations has been described in detail in the embodiments related to the method, which may not be described in detail here.

Figure 5:
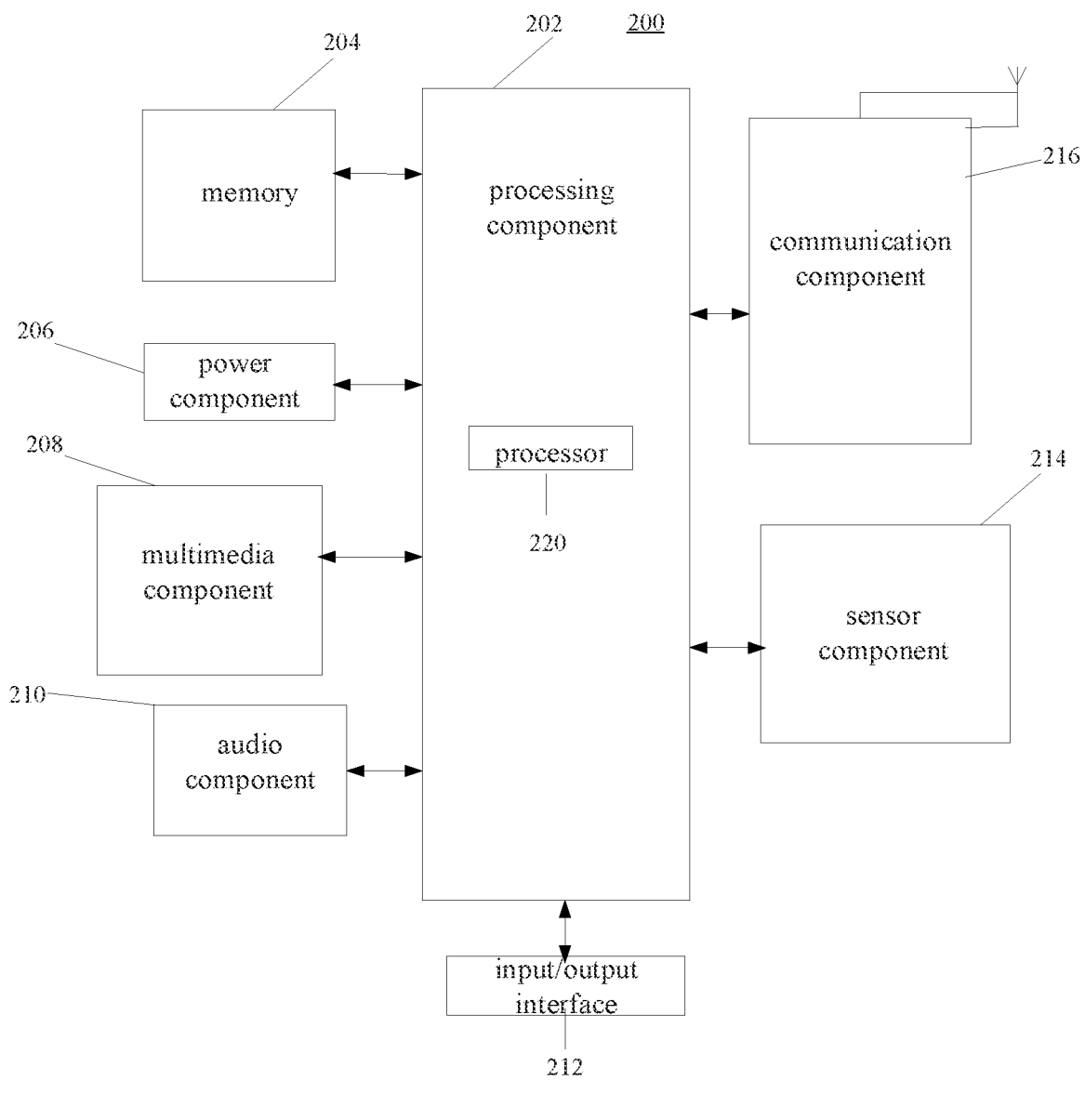
FIG. 5 is a block diagram illustrating a device for communication processing according to an embodiment.

FIG. 5 is a block diagram illustrating a device 200 for communication processing according to an embodiment. For example, the device 200 may be a mobile phone, a computer, a digital broadcast terminal, a messaging device, a game console, a tablet device, a medical device, a fitness device, a personal digital assistant, and the like.

Referring to FIG. 5, the device 200 may include one or more of the following components: a processing component 202, a memory 204, a power supply component 206, a multimedia component 208, an audio component 210, an input/output (I/O) interface 212, a sensor component 214, and a communication component 216.

The processing component 202 generally controls overall operations of the device 200, such as those associated with display, telephone calls, data communications, camera operations, and recording operations. The processing component 202 may include one or more processors 220 to execute instructions, to complete all or part of the steps of the above method. Additionally, the processing component 202 may include one or more modules that facilitate interactions between the processing component 202 and other components. For example, the processing component 202 may include a multimedia module to facilitate interactions between the multimedia component 208 and the processing component 202.

The memory 204 is configured to store various types of data to support operations at the device 200. Examples of such data include instructions for any application program or method operating on the device 200, contact data, phonebook data, messages, pictures, videos, and the like. The memory 204 may be realized by any type of volatile or non-volatile memory device or their combination, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 206 provides power to various components of the device 200. The power component 206 may include a power management system, one or more power supplies, and other components associated with generating, managing, and distributing power for the device 200.

The multimedia component 208 includes a screen that provides an output interface between the device 200 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch or swipe action, but also detect duration and pressure associated with the touch or swipe action. In some embodiments, the multimedia component 208 includes a front camera and/or a rear camera. When the device 200 is in an operation mode, such as a shooting mode or a video mode, the front camera and/or the rear camera may receive external multimedia data Each front camera and rear camera may be a fixed optical lens system or have focal length and optical zoom capability.

The audio component 210 is configured to output and/or input audio signals. For example, the audio component 210 includes a microphone (MIC), which is configured to receive an external audio signal when the device 200 is in an operation mode, such as a call mode, a recording mode, and a voice recognition mode. The received audio signals may be further stored in the memory 204 or sent via the communication component 216. In some embodiments, the audio component 210 also includes a speaker for outputting audio signals.

The I/O interface 212 provides an interface between the processing component 202 and a peripheral interface module. The peripheral interface module may be a keyboard, a click wheel, a button, and the like. These buttons may include, but are not limited to: a home button, volume buttons, a start button, and a lock button.

The sensor component 214 includes one or more sensors for providing various aspects of state assessment for the device 200. For example, the sensor component 214 may detect the open/closed state of the device 200, the relative positioning of components, such as the display and the keypad of the device 200. The sensor component 214 may also detect changes in the position of the device 200 or one component of the device 200, a presence or absence of a contact between the user with device 200, an orientation or acceleration/deceleration of the device 200 and changes in the temperature of the device 200. The sensor component 214 may include a proximity sensor configured to detect the presence of nearby objects in the absence of any physical contact. The sensor component 214 may also include optical sensors, such as CMOS or CCD image sensors, for use in imaging applications. In some embodiments, the sensor component 214 may also include an acceleration sensor, a gyroscope sensor, a magnetic sensor, a pressure sensor or a temperature sensor.

The communication component 216 is configured to facilitate wired or wireless communication between the device 200 and other devices. The device 200 may access a wireless network based on communication standards, such as Wi-Fi, 2G, or 3G, or their combination. In an embodiment, the communication component 216 receives a broadcast signal or broadcast related information from an external broadcast management system via a broadcast channel. In an embodiment, the communication component 216 also includes a near field communication (NFC) module to facilitate short-range communication. For example, the NFC module may be implemented based on radio frequency identification (RFID) technology, infrared data association (IrDA) technology, ultra wide band (UWB) technology, bluetooth (BT) technology and other technologies.

In an embodiment, the device 200 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic component implementation for performing the method described above.

In an embodiment, there is also provided a non-transitory computer-readable storage medium including instructions, such as the memory 204 including instructions, which can be executed by the processor 220 of the device 200 to implement the above method. For example, the non-transitory computer readable storage medium may be the ROM, a random access memory (RAM), a CD-ROM, a magnetic tape, a floppy disk, an optical data storage device, and the like.

The technical solutions according to the embodiments of the disclosure may include the following beneficial effects: the RS of the adjacent satellite beam footprint is measured by obtaining the measurement information of the adjacent satellite beam footprint, the reselection of different satellite beam footprints may be thus achieved based on the measurement of the RS.

It may be further understood that "a plurality of" in the disclosure refers to two or more, and other quantifiers are similar to the term "a plurality of". "And/or" describes an association relationship between associated objects, indicating that there may be three types of relationships, for example, A and/or B may indicate: A exists alone, A and B exist simultaneously, and B exists alone. The character "/" generally indicates that the contextual objects are in an "or" relationship. The singular forms "a/an", "said" and "the" are also intended to include the plural unless the context clearly dictates otherwise.

It may be further understood that the terms "first", "second", etc. are used to describe various information, but the information should not be limited to these terms. These terms are only used to distinguish information of the same type from one another, and do not imply a specific order or degree of importance. In fact, expressions such as "first" and "second" can be used interchangeably. For example, without departing from the scope of the disclosure, first information may also be called second information, and similarly, second information may also be called first information.

It may be further understood that although the operations are described in a specific order in the drawings in the embodiments of the disclosure, it should not be understood as requiring that these operations may be performed in the specific order shown or in a serial order, or all the operations shown may be performed to obtain a desired result. In certain circumstances, multitasking and parallel processing may be advantageous.

Other embodiments of the disclosure may be readily apparent to those skilled in the art from consideration of the specification and practice of the invention disclosed herein. This disclosure is intended to cover any modification, usage or adaptation of the disclosure, which follow the general principles of the disclosure and include common knowledge or conventional technical means in the technical field not disclosed in the disclosure.

It should be understood that the disclosure is not limited to the precise constructions which have been described above and shown in the drawings, and various modifications and changes may be made without departing from the scope of the disclosure.

13

What is claimed is:

1. A method for communication processing, performed by a terminal, comprising:

obtaining, from a network device, measurement information of an adjacent satellite beam footprint of a satellite beam footprint to which the terminal currently belongs; and measuring a reference signal of the adjacent satellite beam footprint based on the measurement information, wherein the measurement information comprises resource configuration information of the reference signal of the adjacent satellite beam footprint, and the resource configuration information comprises at least one of a reference signal resource identity, reference signal resource time domain information, reference signal resource frequency domain information, reference signal resource code domain information, or reference signal resource antenna port information.

2. The method according to claim 1, wherein the satellite beam footprint to which the terminal currently belongs and the adjacent satellite beam footprint have a same physical cell identity.

3. The method according to claim 2, wherein the measurement information further comprises frequency domain resource information of the adjacent satellite beam footprint.

4. The method according to claim 3, wherein the frequency domain resource information comprises one or more of a component carrier and a bandwidth part.

5. The method according to claim 1, wherein the satellite beam footprint to which the terminal currently belongs and the adjacent satellite beam footprint have different physical cell identities.

6. The method according to claim 5, wherein the measurement information comprises at least one of a physical cell identity of a cell to which the adjacent satellite beam footprint belongs, or a satellite identity.

7. The method according to claim 1, wherein the satellite beam footprint to which the terminal currently belongs and the adjacent satellite beam footprint are in a coverage area of a same satellite.

8. The method according to claim 1, wherein a frequency domain resource used by the satellite beam footprint to which the terminal currently belongs is the same as a frequency domain resource used by the adjacent satellite beam footprint.

9. The method according to claim 8, wherein a component carrier used by the satellite beam footprint to which the terminal currently belongs is the same as a component carrier used by the adjacent satellite beam footprint, a bandwidth part used by the satellite beam footprint to which the terminal currently belongs is different from a bandwidth part used by the adjacent satellite beam footprint; and the measurement information comprises bandwidth part information, and comprises at least one of a physical cell identity or a satellite identity.

10. The method according to claim 1, wherein the satellite beam footprint to which the terminal currently belongs and the adjacent satellite beam footprint are in coverage areas of different satellites.

11. The method according to claim 10, wherein the measurement information further comprises at least one of bandwidth part information, a physical cell identity or a satellite identity.

12. The method according to claim 10, wherein a component carrier used by the satellite beam footprint to which the terminal currently belongs is different from a component carrier used by the adjacent satellite beam footprint; and

the measurement information comprises at least one of component carrier information, a physical cell identity or a satellite identity.

13. The method according to claim 1, wherein a frequency domain resource used by the satellite beam footprint to which the terminal currently belongs is different from a frequency domain resource used by the adjacent satellite beam footprint.

14. The method according to claim 1, wherein the measurement information comprises at least one of an identity of the adjacent satellite beam footprint or a satellite identity.

15. The method according to claim 1, wherein before measuring the reference signal of the adjacent satellite beam footprint based on the measurement information, the method further comprises at last least one of:

determining that a reference signal received power of the satellite beam footprint to which the terminal currently belongs is lower than a specified received power threshold, or determining that a reference signal received quality is lower than a specified received quality threshold.

16. The method according to claim 15, further comprising:

in response to determining that at least one of the reference signal received power or the reference signal received quality of the adjacent satellite beam footprint satisfies a preset reselection trigger condition, reselecting the adjacent satellite beam footprint.

17. A terminal, comprising:

a processor; and a memory for storing instructions executable by the processor;

wherein the processor is configured to:

obtain, from a network device, measurement information of an adjacent satellite beam footprint of a satellite beam footprint to which the terminal currently belongs; and measure a reference signal of the adjacent satellite beam footprint based on the measurement information, wherein the measurement information comprises resource configuration information of the reference signal of the adjacent satellite beam footprint, and the resource configuration information comprises at least one of a reference signal resource identity, reference signal resource time domain information, reference signal resource frequency domain information, reference signal resource code domain information, or reference signal resource antenna port information.

18. A non-transitory computer-readable storage medium having stored therein instructions that, when executed by a processor of a mobile terminal, cause the mobile terminal to perform:

obtaining, from a network device, measurement information of an adjacent satellite beam footprint of a satellite beam footprint to which the mobile terminal currently belongs; and measuring a reference signal of the adjacent satellite beam footprint based on the measurement information, wherein the measurement information comprises resource configuration information of the reference signal of the adjacent satellite beam footprint, and the resource configuration information comprises at least one of a reference signal resource identity, reference signal resource time domain information, reference signal resource frequency domain information, reference signal resource code domain information, or reference signal resource antenna port information.

\* \* \* \* \*